W. L. FODREA.
MOTOR VEHICLE.
APPLICATION FILED JULY 14, 1914.
1,216,975.
Patented Feb. 20, 1917.
3 SHEETS—SHEET 2.
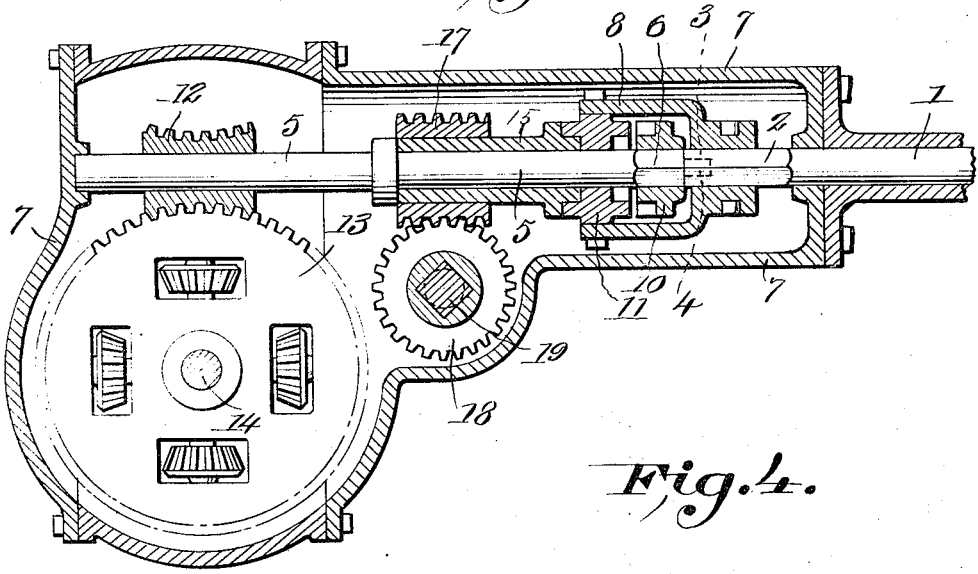
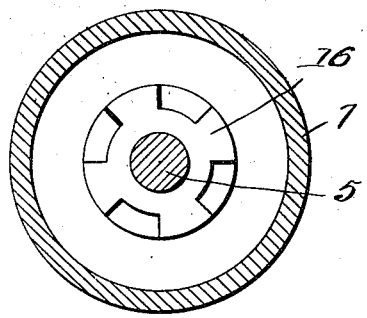
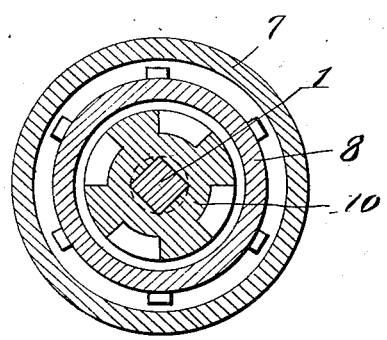
Witnesses
Inventor
William L. Fodrea,
By
his Attorney

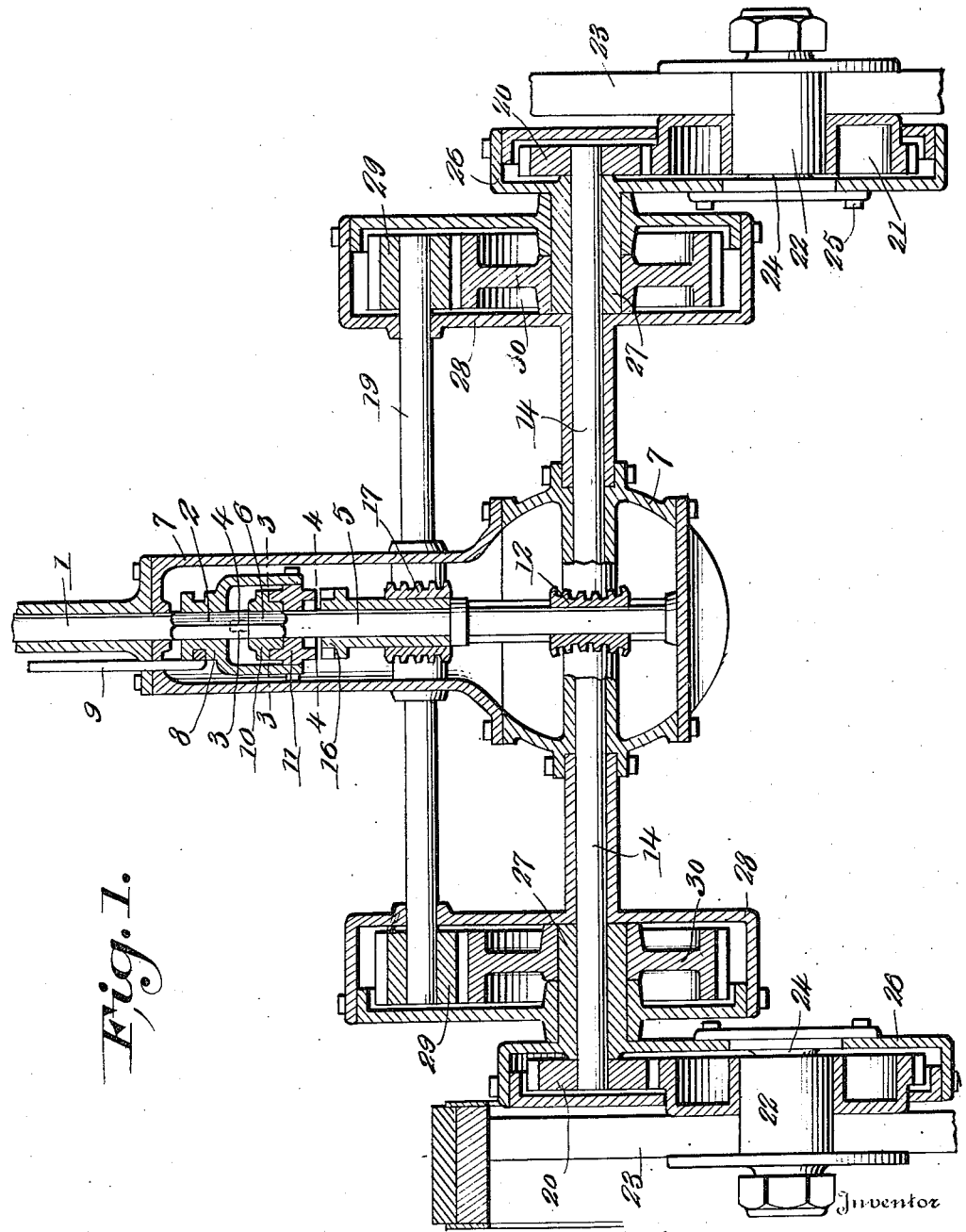

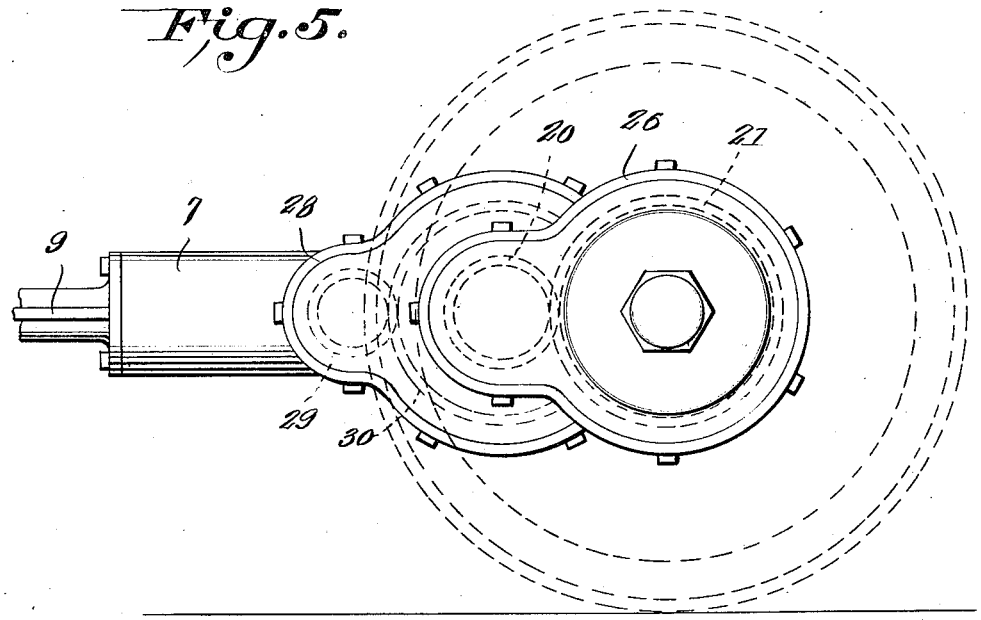
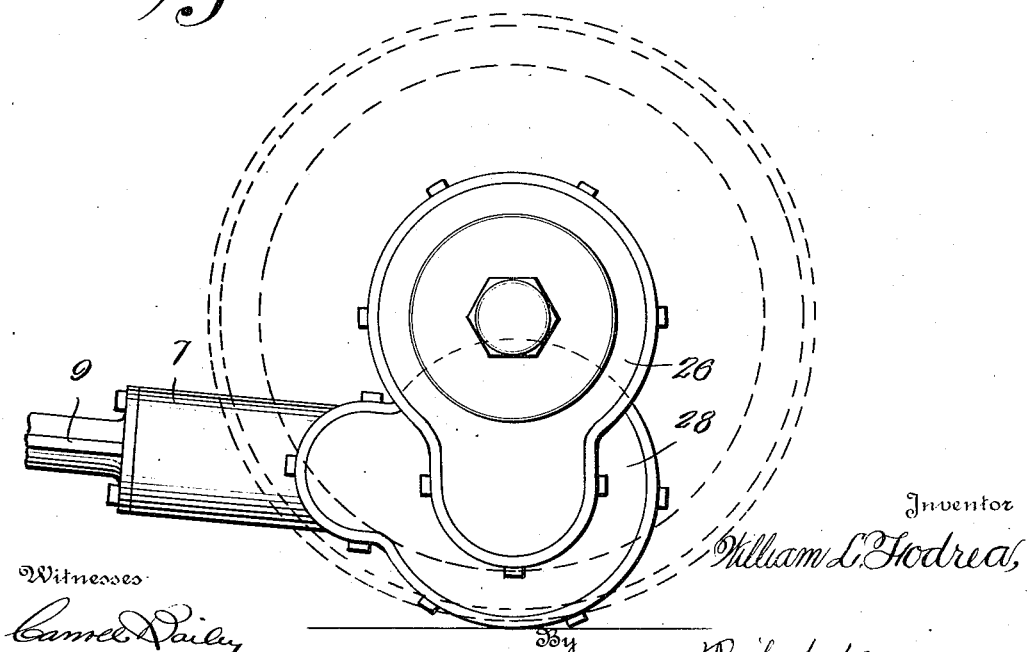

UNITED STATES PATENT OFFICE.

WILLIAM L. FODREA, OF ARKADELPHIA, ARKANSAS.

MOTOR-VEHICLE.

1,216,975.  Specification of Letters Patent.  Patented Feb. 20, 1917.

Application filed July 14, 1914. Serial No. 850,965.

*To all whom it may concern:*

Be it known that I, WILLIAM L. FODREA, citizen of the United States, residing at Arkadelphia, in the county of Clark and State of Arkansas, have invented certain new and useful Improvements in a Motor-Vehicle, of which the following is a specification.

My invention relates to improvements in motor vehicles, and for its primary object aims to provide a means whereby the body or chassis of the vehicle may be alternately raised and lowered relatively to the ground, to in this manner, if necessary "walk" or cause the vehicle to be moved forwardly or backwardly as occasion may demand, in step-like progress, irrespective of a rotation of the vehicle wheel.

A further object of the invention contemplates a structure wherein and whereby, when idle, the weight of the car may be so supported as to relieve the tires of the stress and strain usually incident thereto.

The invention as a still further object resides in the provision of suitable mechanism arranged to permit, in one application of the invention, movement of the vehicle through a driving of the wheel in the usual manner, and, when desired, by shifting said mechanism, movement of the vehicle in such a novel and peculiar manner as to advance the same, the wheels thereof remaining idle or stationary.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a longitudinal sectional view, partly broken away illustrating the arrangement comprising the present invention in connection with the rear axle of a motor vehicle;

Fig. 2 is a similar view, the sections being taken in a transverse direction;

Fig. 3 is an enlarged section on the line 3—3 of Fig. 1;

Fig 4 is a similar view on the line 4—4 of Fig. 1;

Fig. 5 is a side elevation illustrating the normal position of the movable parts; and Fig. 6 is a similar view, the movable parts being shown in their lowermost position.

Referring now to the drawings by numerals, 1 designates the driven shaft, the extremity of which is angular in cross section as indicated at 2 and provided with a recess 3 for the reception of a projection 4 integral with and upon the extremity of an auxiliary shaft 5 arranged in axial alinement with said shaft 1 and forming a continuation thereof, said shaft 5 being also angular in cross section as indicated at 6. Said shafts 1 and 5 are journaled within suitable bearings provided therefor. A casing 7 is provided, within which a clutch operating element 8 is arranged, said element being slidable upon the squared portion of the shaft 1 and provided with an operating rod 9 whereby sliding movement may be imparted to said element, said rod passing through an opening therefor within the casing. A stationary clutch member 10 is mounted upon the angular portion of the auxiliary shaft 5, while a double faced sliding clutch member 11 is also mounted upon said shaft and secured in any suitable manner to the operating element 8 above noted. Said member 11 when in engagement with the member 10, as illustrated in Fig. 1 of the drawings will cause motion to be transmitted from driven shaft 1 to auxiliary shaft 5 and, as the latter is provided with a worm 12 meshing into the differential designated as an entirety by the numeral 13, it is apparent that the rear axle 14 of the vehicle is driven as the said rear axle carries the said differential thereupon.

A sleeve 15 is loosely mounted upon the auxiliary shaft 5, said sleeve terminating at one end in a clutch member 16 into engagement with which the sliding clutch member 11 is adapted to be thrown. Said sleeve 15 carries a worm 17 meshing into a gear 18 mounted upon a shaft 19 extending transversely of driven shaft 1 and parallel with the rear axle 14 above mentioned. The clutch member 11 when in engagement with the clutch 16 will cause motion to be transmitted from driven shaft 1 to shaft 19.

A pinion 20 is mounted upon each end of the axle 14, the pinions being adapted for engagement with gears 21 keyed or otherwise fixedly secured to the spindles 22 upon which the rear wheels 23 of the vehicle are mounted. Said spindles 22 are sleeve-like in their nature and mounted for rotation upon stud shafts 24 made rigid as indicated at 25 with the casings 26 within which pinions 20 and gears 21 operate. A sleeve-like extension 27 is integral with each casing 26, said extensions embracing the rear axle 14 and serving as a means whereby the said casings 26 are mounted for bodily movement, this being made possible by the arrangement of a second casing 28 rigid with casing 7 and providing bearings for the said rear axle.

Upon the respective extremities of the shaft 19 pinions 29 are mounted, said pinions operating within the casings 28 and meshing into gear wheels 30 rigid with the sleeve-like extensions 27 of the casings 26. Said casings 28 are so formed as to serve as bearings for the sleeve-like extensions 27.

Operation is as follows: When it is desired that the machine or vehicle be advanced or moved backwardly in the usual manner, sliding clutch member 11 is moved into engagement with member 10 causing motion to be transmitted from shaft 1 to auxiliary shaft 5, and the latter by reason of the worm 12 and differential 13 will cause the rear axle 14 of the vehicle to be driven. Said axle 14 carries the pinions 20 which in turn mesh into gear wheels 21 and, as the latter are rigid with the sleeve-like spindles 22, it is apparent that the rear wheel 23 will be driven in the desired manner. If, upon practical application, it is found necessary to cause wheels 23 to remain idle and the body or chassis of the vehicle alternately raised and lowered relatively to the ground to "walk" or cause the machine to move in step-like progress, clutch member 11 is moved into engagement with member 16 causing sleeve 15 to be rotated through rotation of driven shaft 1. Said sleeve 15 having worm 17 mounted thereupon will cause motion to be transmitted to shaft 19, the latter carrying a gear 18 meshing into said worm. As shaft 19 is rotated, pinions 29 cause gear wheels 30 to be moved and, as said wheels 30 are rigid with extensions 27 of the casings 26, it is apparent that the latter will bodily move, the pinions 20 idling upon gears 21, in the path of a circle to in this manner bodily raise or lower the body or chassis of the machine.

From the foregoing, taken in connection with the accompanying drawings it will be noted that by the bodily movement of the car body in the path of a circle, skid chains or the like when the car is stuck may be eliminated, as the movement of the said casing 28 in the path of a circle as indicated to advantage in Figs. 5 and 6 of the drawings will cause the machine to be advanced or moved backwardly in a step by step progress irrespective of rotation of the wheels 23; that during repair, the body of the car may be supported above the ground, thereby eliminating the use of a lifting jack or other similar device; and that while upon the road, the body of the car may be raised to provide for the travel of the car over rocks or stumps that would otherwise hinder progress.

Attention is also called to the fact that by the bodily movement of the rear axle, the wheel base of the car may be lengthened for practical road use or shortened, if operating within a garage; and that when employed in connection with an automobile truck or the like, loading and unloading, by vertically adjusting the body of the truck, is greatly facilitated.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a motor vehicle, propelling mechanism including the combination of driving wheels, an axle eccentrically mounted relatively to the driving wheels a driving connection between the axle and supporting wheels to drive the said wheels, and means for producing orbital movement of the axle and connection relative to the drive wheels, said means contacting with the ground to advance the vehicle.

2. In a propelling means for vehicles, supporting and driving wheels therefor, a power means connected with said driving wheels, a means movable in the path of a circle and into and out of engagement with the ground to advance the machine, and a connection between said last mentioned means and the power means.

3. In a vehicle, supporting and driving wheels therefor, a power means, a connection between said power means and said wheels, a means movable bodily in the path of a circle and intermittently into and out of engagement with the ground to propel the machine, a connection between said last mentioned means and said power means, and a clutch means associated with said power means for the purpose specified.

4. In a vehicle, supporting and driving wheels therefor, a power means, a connection between said power means and said wheels, a means movable bodily in the path of a circle and into and out of engagement with the ground to propel the vehicle, said last mentioned means forming a part of the connection between said power means and said wheels, a connection between said power means and the bodily movable means, and a single clutch operable to control operation of both the wheel driving means and the bodily movable means, substantially as described.

5. In a vehicle, the combination with the supporting and driving means and the power means therefor, of an auxiliary propelling means bodily movable in the path of a circle and into and out of engagement with the ground, and a means to drive said auxiliary means through the agency of said power means.

6. In a vehicle, the combination with the supporting and driving wheels and the power means therefor, of an auxiliary propelling means comprising a member bodily movable in the path of a circle and into and out of engagement with the ground, a connection between said member and said power means, and a clutch operable to connect the power means with either the driving wheels or the auxiliary propelling means, substantially as described.

7. In a motor vehicle, a driven shaft, wheels, said wheels being driven through rotation of said shaft, clutch mechanism, and means controlled by movement of said clutch to bodily raise or lower the vehicle body relatively to the ground.

8. A motor vehicle including a driven shaft, means actuatable through rotation of said shaft to move the vehicle body in the path of a circle and into and out of engagement with the ground, wheels, said wheels being actuatable through rotation of said shaft, and clutch mechanism actuatable to render the wheels stationary during bodily movement of said vehicle body or vice versa.

9. A motor vehicle including a driven shaft, wheels, means actuatable through rotation of said shaft to drive said wheels, clutch mechanism, means actuatable through rotation of said shaft to move the body of the vehicle in the path of a circle sufficiently large to cause said body to intermittently engage the ground and advance the vehicle, movement of said clutch mechanism adapted to render the wheels inoperative during movement of the vehicle body or vice versa, as and for the purpose set forth.

10. In a motor vehicle, propelling mechanism therefor, including in combination drive wheels, an axle eccentrically mounted relative to the drive wheels, gearing between the axle and said wheels, a casing for said gearing, an auxiliary shaft, auxiliary gearing between said auxiliary shaft and the gear casing, a casing for the auxiliary gears, a drive shaft, gears connecting the drive shaft and the axle whereby the drive wheels may be rotated during forward movement of the vehicle, and means for rotating the auxiliary shaft from the drive shaft to produce orbital movement of the axle and auxiliary gear casing relative to the drive wheels, said auxiliary gear casing contacting with the ground to advance the vehicle.

11. In a motor vehicle propelling means therefor, including in combination drive wheels, gears rotatable with the drive wheels, an axle mounted eccentrically relative to the axis of the drive wheels, gears on the axle meshing with the aforesaid gears, gear casings for the gears, a sleeve on each gear casing surrounding the axle, gears fixed to the sleeves, an auxiliary shaft, gears on the eccentric shaft meshing with the sleeve gears, a drive shaft and differential forming a connection with the axle, gear casings for the auxiliary gears, an axle housing integral with said auxiliary gear casing, and means for connecting the axle and auxiliary shaft alternately for rotation with the drive shaft.

In testimony whereof I affix my signature in presence of two witnesses.

WILLIAM L. FODREA.

Witnesses:
WILLIAM C. MCMICHAEL,
ARTHUR J. VESTAL.